April 3, 1951 W. E. KIRKPATRICK 2,547,397

SIGNAL SAMPLING AND MODULATION

Filed Dec. 29, 1948 2 Sheets-Sheet 1

INVENTOR
W. E. KIRKPATRICK
BY N. D. Ewing
ATTORNEY

April 3, 1951 W. E. KIRKPATRICK 2,547,397

SIGNAL SAMPLING AND MODULATION

Filed Dec. 29, 1948 2 Sheets-Sheet 2

INVENTOR
W. E. KIRKPATRICK
BY
N. D. Ewing
ATTORNEY

Patented Apr. 3, 1951 2,547,397

UNITED STATES PATENT OFFICE 2,547,397

SIGNAL SAMPLING AND MODULATION

William E. Kirkpatrick, Chatham, N. J., assignor to Bell Telephone Laboratories, Incorporated, New York, N. Y., a corporation of New York Application December 29, 1948, Serial No. 67,829

12 Claims. (Cl. 332—40)

This invention relates to signal translation and more particularly to electronic commutation suitable for time division multiplex carrier transmission systems.

In general, in time division multiplex telephone systems, a plurality of complex signals or electrical impulses or waves, corresponding, for example, to speech or music, are produced at individual sending stations, commutated at a central or common transmitter and then transmitted as a multiplex signal to a receiver. At the receiver, the signals corresponding to the original complex signals or waves are segregated and distributed to individual receiving stations. Transmission of the multiplexed signals is accomplished at carrier frequencies greater than the speech frequencies from the individual sending stations. This requires the use of additional modulating apparatus at each of the signal channels for individual channel transmission at different carrier frequencies or in common with each of the signal channels for transmission at the same carrier frequency.

Accordingly, it is an object of this invention to provide a combined multichannel signal sampling and modulating device whereby the separate energies contained in a series of input channels may be sampled and frequency translated within a single commutating tube to obtain a time separation of output signal samples which differ in frequency from the input signals by the frequency of the carrier or modulating source.

It is a further object to obtain a time separation of output signal samples at different carrier frequencies by the use of a separate carrier frequency in each of the individual input channels.

The invention features the use of non-linear effects in the secondary emission path between a collector and secondary emissive target elements in a cathode ray tube to produce a change in the frequency band at which intelligence is to be transmitted, more specifically modulation.

In accordance with one feature of the invention signal waves from a series of separate signal input channels are individually impressed upon corresponding target elements in a cathode ray tube to vary the secondary emission from the individual targets in accordance with the signal waves. High-frequency carrier waves of the frequency at which transmission is to take place are further impressed upon each of the corresponding target elements. Modulation of the impressed signal waves at the carrier or transmission frequency is obtained by the non-linearity of the secondary electron current paths and is effected concurrently with the sampling action of the rotating beam.

In accordance with another feature of the invention each signal channel is assigned a different carrier frequency and transmission of their sampled outputs is achieved at different carrier frequencies.

The above-noted and other objects and features of this invention will be better understood from the detailed description of the following specific embodiments chosen for the purposes of illustration:

Figure 1:
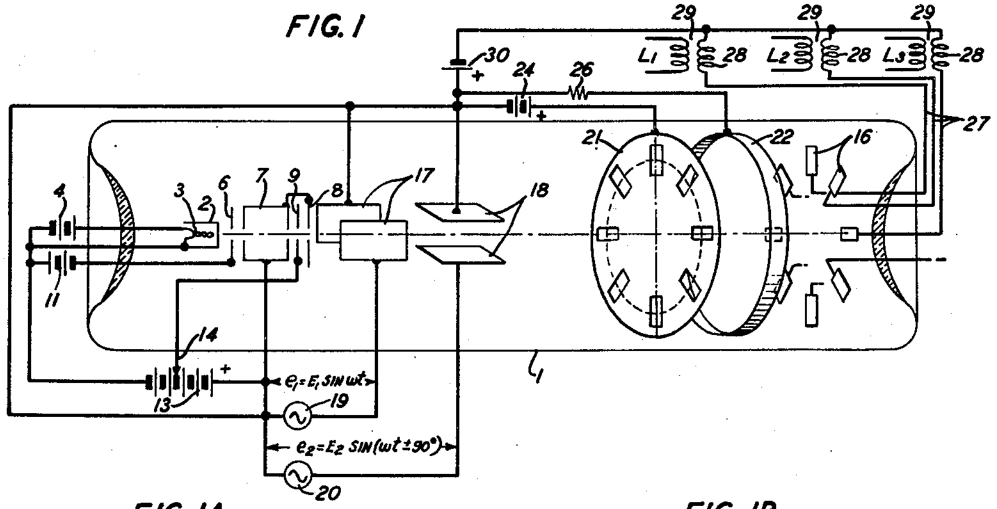
Fig. 1 illustrates the beam tube and associated circuits in one form of the invention.

Referring now more particularly to Fig. 1, there is illustrated a form of cathode ray commutator or distributor tube in which the glass envelope 1 surrounding the elements within the tube is evacuated to a pressure low enough so that the free passage of electrons emitted from cathode 2 is not interfered with appreciably by the presence of gas molecules. A heating element 3 energized by an external voltage source 4 raises the cathode to a temperature at which electrons are emitted freely therefrom. Control grid 6, anodes 7—8 and focusing anode 9 constitute the gun structure and are all constructed of metal sheets sensibly parallel to the cathode surface, each sheet being perforated by a circular aperture coaxial about the tube axis. Control grid 6 is connected to an external potential source 11 adjusted to give the required current in the tube. Elements 7 and 8 are connected internally and the lead connected to anode 7 passes through the glass envelope to an external positive potential source 13, the negative terminal thereof being connected to the external cathode lead. Focusing anode 9 is connected to an adjustable intermediate point 14 of source 13. By proper adjustment of tap 14 it will be possible to focus the electrons passing through the gun structure to a minimum area on, or in the neighborhood of, the rectangular target plates 16 whose function will be discussed below.

Orthogonal deflection plate pairs 17 and 18 are equally spaced about the longitudinal axis of the tube as illustrated in Fig. 1 and constitute the internal deflection system of the beam tube, one plate of each pair being connected to respective alternating potential sources 19 and 20. The remaining plates of each pair are connected together to the other sides of the potential sources 19 and 20 which are connected in common back to the positive side of source 13.

The alternating potential sources represented by the expressions $$e_1=E_1 \sin \text{wt, and}$$
$$e_2=E_2 \sin (\text{wt}\pm 90°)$$

are of the same frequency and their outputs are such that the phase of one is 90 degrees out of phase with the other.

In addition, the amplitudes $E_1$ and $E_2$ of potential sources 19 and 20 are independently adjustable without affecting their quadrature phase relationship. It is well known that such an arrangement of potentials may be properly adjusted to give to the electron beam passing through the deflection system a rotating motion so that in any plane perpendicular to the tube axis and at a reasonable distance beyond the deflection system the deflected beam will trace out in time sequence a circular path, the rotational frequency being the same as that of the alternating sources 19 and 20. Such a circular path is indicated by the dotted line on aperture plate 21. Moreover, the focusing effect noted in connection with the gun structure may still be employed and the rotating beam may be focussed to trace out a thin ring of electrons.

Figure 1A:
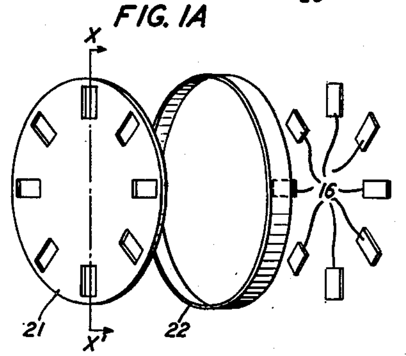
Fig. 1A illustrates one form of end electrode assembly known collectively as the target electrodes.

The form of invention disclosed in Fig. 1 comprises, in addition to features already discussed, a set of several electrodes known collectively as the target electrodes and individually designated as an aperture plate 21, a collector ring 22, and the aforementioned target plates 16. These electrodes are shown in some detail at Fig. 1A in which the supports for the electrodes are omitted, their construction being of the type well known in the art. Connections from each of the target plates and from each of the collector ring and aperture plates are brought outside the glass envelope 1 through a second press located at the other end of the tube.

The aperture plate 21 consists of a metal sheet which is perforated at a common radial distance from the tube axis by a series of equally spaced apertures which for purposes of illustration are shown in rectangular form. The collector ring 22 is a circular metal band or annular ring arranged coaxially with the tube axis behind the aperture plate and at such a distance from the tube axis that electrons deflected by plates 17 and 18 to pass through the aperture plate holes do not strike the collector ring. The target plates 16 which may be of rectangular shape as shown or other form are slightly larger than the apertures in plate 21 and are mounted so that electrons passing through the apertures will strike the individual target plates, the arrangement being such that the electrons passing through an aperture will strike only the one target mounted behind that aperture. This action will be understood more readily by reference to Fig. 1B which includes a cross-section of 21, 22 and 16 taken through XX' of Fig. 1A. The path of the electron beam at the particular instant of time at which the beam passes through the aperture and strikes the corresponding target plate is indicated by the dotted line *a* in the figure.

The circuit connections to the target electrodes 21, 22 and 16 are shown in Fig. 1 which discloses the aperture plate 21 connected to the positive side of an external potential source 24 of some tens of volts, the negative side of said potential source being connected to the positive side of source 13 as shown. The collector ring 22 is connected through a load circuit 26 also to the positive side of source 13. The target plates 16 are connected through individual leads 27 to the secondary sides 28 of separate transformers 29. The other sides of the secondary windings are all connected to the negative side of a potential source 30, the positive side of said source again being connected to the positive side of source 13.

Figure 1B:
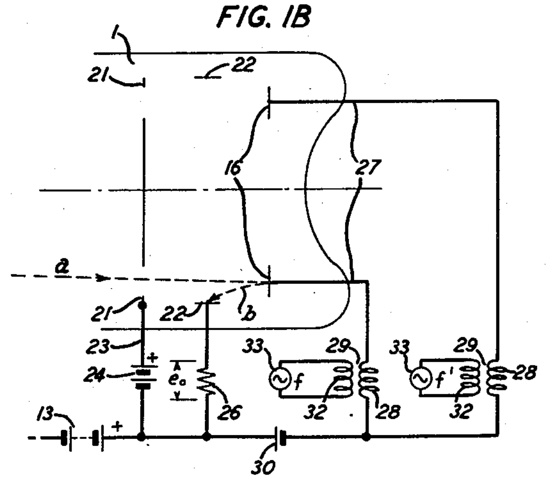
Fig. 1B illustrates the connection of external circuits to the target electrodes.

The connections for the target electrodes are also reproduced in Fig. 1B. Source 13 is of high enough voltage so that primary electrons from the cathode strike the target plate 16 with sufficient energy to release secondary electrons. The voltage sources 24 and 30 are low compared to voltage source 13 so that they have negligible effect on the velocity of the primary beam. Since by reason of source 30 the collector ring 22 is more positive than 16, secondary electrons released by the latter tend to flow to the ring collector as shown by dotted path *b*. Aperture plate 21 is still more positive than 22 but the influence of 22 is made to predominate by virtue of its proximity to the target plates so that substantially all of the secondary electrons released by 16 will flow to 22 in preference to 21. The aperture plate 21 is maintained at the most positive potential of any electrode in the tube. Hence, any secondary electrons released by the aperture plate in the passage of the primary beam across the aperture plate in going from one aperture to the next will return to the aperture plate.

Figure 2:
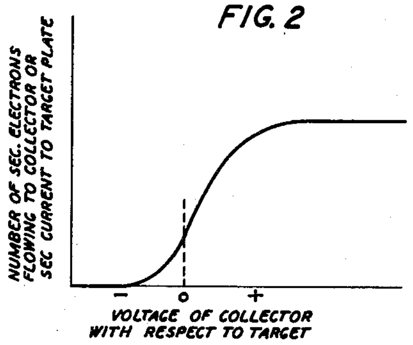
Fig. 2 illustrates the secondary emission characteristic of the tube.

To understand the above action more clearly, attention will now be focussed on the behavior of the secondary electron flow in the circuit through which it passes under the influence of the voltage 30. This secondary flow is illustrated in Fig. 2. In the figure, when the collector is negative with respect to the target, secondary electrons released by the target return to the target. When the collector is positive with respect to the target secondary electrons can reach the collector. Because of space charge effects and finite emission velocities of the secondary electrons, this transition from zero collector electron flow to the maximum electron flow is not sharp but is of a curved nature as shown in Fig. 2. This secondary current circulates in the path of Fig. 1B from 16 through 27, 28, 30 thence by way of the common connection to 26, 22 and through the space within the tube back to 16. In Fig. 2 if account is taken of the convention between current and electron flow, the ordinate is also the secondary current going to the target. Hence Fig. 2 also represents the current in the target-collector circuit through the external path noted above. The curve of Fig. 2 shows that the current-voltage relation in the target-collector circuit is non-linear.

The invention, in common with other non-linear devices such as vacuum tubes or copper oxide varistors, is adapted for modulation, detection, frequency multiplication and other similar purposes which require a non-linear current-voltage path. Thus, by way of illustration, in Fig. 1B if the primary winding 32 of transformer 29 is supplied from an alternating-current generator 33 of frequency $f$ and voltage source 30 is adjusted to permit operation in the region of the non-uniformly changing currents of Fig. 2, in addition to current flow at frequency $f$, current at $2f$, $3f$, etc. will flow in the target-collector circuit. If the load impedance 26 has a finite impedance at, say $2f$, a voltage at frequency $2f$ will appear across it as a component of the output voltage $e_o$. This is the well-known effect of frequency multiplication by a non-linear element.

Figure 1C:
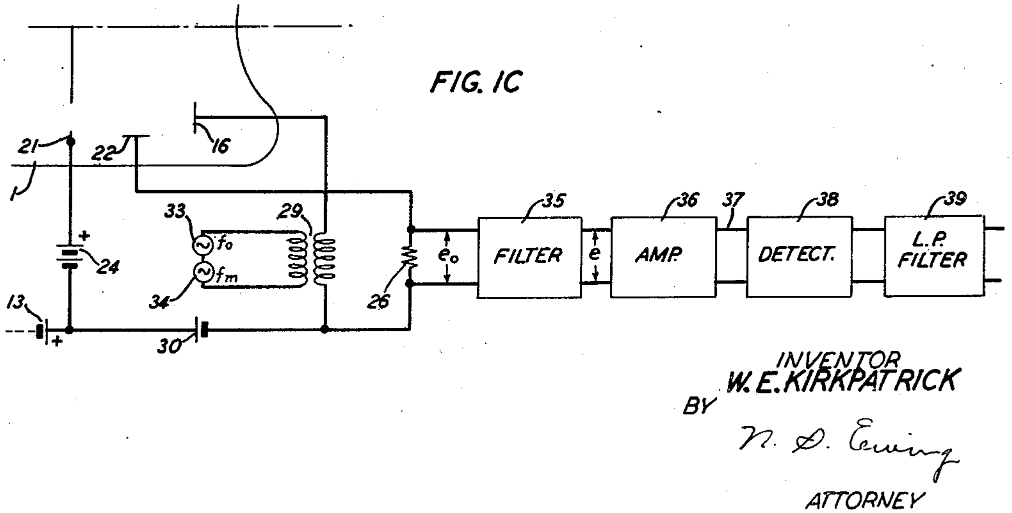
Fig. 1C illustrates the use of the device for modulation purposes.

In similar fashion Fig. 1C, showing but the lower half of Fig. 1B for convenience, illustrates the use of the device for modulation purposes. In this case in addition to the signal source 33, a second source 34 of carrier frequency $f_m$ is introduced. Energy from the two sources $f_o$ and $f_m$ couple through the transformer 29 into the collector-target circuit. Because of the non-linear action in the circuit path, sum and difference frequencies, as well as other new frequencies, appear. In particular, currents at frequencies $f_m+f_o$ and $f_m-f_o$ will circulate in the circuit under discussion and if the load impedance 26 is a selective network which responds to one of these new frequency components and discriminates against others, then the desired new frequency component may be isolated from the others. Thus, by the action of the non-linear current-voltage relation existing in the secondary emission stream, the modulation process has been effected.

The modulation process has been explained in terms of the primary beam strking a single target plate with no comment on the length of time the beam is to rest on the plate. It will be apparent, however, that if the beam rests on a target plate for a length of time which is large compared to a carrier frequency cycle, the effect described above will occur. Analysis will show that this effect occurs even if the beam rests on the target plate for just a portion of a carrier frequency cycle. This will be better understood by reference to Figs. 3 to 3E.

Figures 3, 3A, 3B, 3C, 3D, 3E:
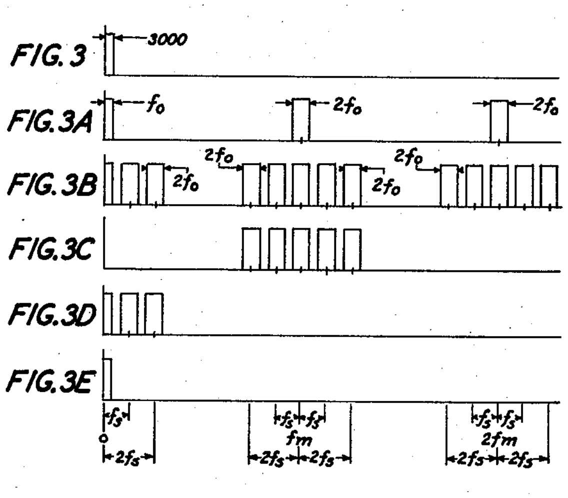
Figs. 3, 3A, 3B, 3C, 3D and 3E illustrate the distribution of output energy in the frequency spectrum at various points in an operating system.

In Fig. 3, the band $f_o$ extending from say 0 to 3,000 cycles is shown. This may be considered to be the frequency range of the input signal generator 33 of Fig. 1C. The source $f_m$ of the latter figure may be taken as the carrier frequency generator. Then the combination of $f_o$ and $f_m$ passed through the non-linear target-collector circuit will give rise to sum and difference frequencies as shown by 3A where response will be found in the band of $f_o$ on either side of 0 (negative frequencies excluded), $f_m$, $2f_m$, . . . $nf_m$, etc. Now it can be shown that if electrical interference is to be avoided in the process of using a rotating beam, the speed of rotation of the beam should be more than twice the highest frequency contained in the original intelligence. In this case, where the highest frequency has been selected as 3,000 cycles, a rotational frequency for the beam of 8,000 cycles is satisfactory.

If these frequencies are selected, then the effect of the rotating beam is illustrated in Fig. 3B which shows that about each of the frequencies present in 3A, that is, $o$, $f_m$, $2f_m$, etc. additional bands of width $2f_o$ spring up on either side separated by multiples of the rotational frequency $f_s$, that is, by $f_s$, $2f_s$, . . . $nf_s$, etc. Suppose now that the filter 35 of Fig. 1C, is designed to select the frequency range about $f_m$. The output voltage $e$ of the latter figure will then be given by 3C. This spectrum may be amplified if desired by amplifier 36, transmitted over lines 37, or otherwise, in the frequency range about $f_m$, and ultimately detected by conventional and well-known methods as at 38 from which the low frequency spectrum may be recovered. This low frequency spectrum will consist of the original signal band $f_o$ and bands of $2f_o$ centered about $f_s$, $2f_s$, . . . $nf_s$, etc., as shown in Fig. 3D. A low frequency filter, 39 will remove all but the band $f_o$ thus recovering the original signal input as in 3E.

From Fig. 3B it is apparent that if $f_m$ is too small, the responses introduced by the commutating action of the rotating beam will overlap into responses from adjacent responses of multiples of $f_m$. This would produce electrical interference from which it would be difficult to recover the signal input. In like fashion, the rotational frequency $f_s$, if not at least twice the signal input frequency will cause an overlap of the frequencies introduced by the beam rotation into the original signal band and thus introduce distortion into the recovered original signal.

Mathematically, the sidebands centered about, say $f_m$, extend on indefinitely on either side of $f_m$, so that high order sidebands will fall into channels centered about other frequencies in the spectrum. In practice, the higher order sideband amplitudes fall off so that proper choice of $f_m$ and $f_s$ may be made to produce an operative system.

It will be understood that the spectrum shown in Fig. 3B exists only as long as the beam rests on the corresponding target. The spectrum amplitude will vary in accordance with the amplitude of the signal frequency applied to the target plate. At other times of the beam rotational period when the beam strikes the aperture plate or other target plates, the currents circulating in the target-collector circuit under discussion are zero.

Figure 4:
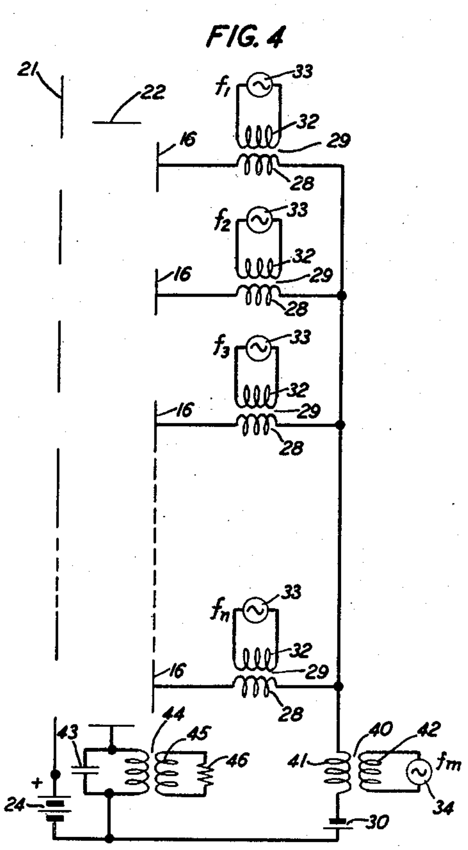
Fig. 4 illustrates the use of a single carrier generator for all signal channels.

The particular embodiment of the target electrodes thus far considered may be sketched in linear array for ease of understanding how a single carrier generator may be used for all channels. This is done in Fig. 4 in which a second transformer 40 common to all the plates 16 through secondary winding 41 is shown. The carrier frequency source 34 is introduced through the primary 42 of transformer 40. A resonant circuit consisting of condenser 43 and inductance 44 and tuned to the neighborhood of $fm$ may be used to produce the filtering action described in conjunction with Fig. 3C. The energy about the frequency $fm$ can be coupled to the load 46 through coupling inductance 45.

From the discussion in the preceding paragraphs it is apparent that the output energy in 46 will consist of a time sequence of energy bands all centered about $fm$.

Figure 5:
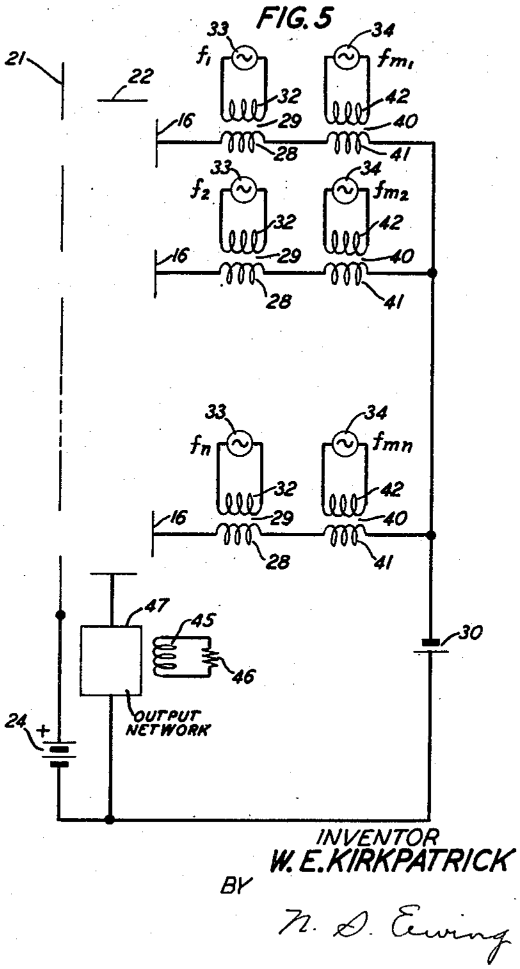
Fig. 5 illustrates the use of different carrier frequency sources in the individual signal channels.

Fig. 5 discloses a method of using a series of carrier frequencies, 34, operating at different carrier frequencies. In this case, individual transformers 40 are connected to each of the signal channels through respective secondary windings 41, and carrier frequency sources 34 of frequencies $fm_1$, $fm_2$, $fm_3$, . . . $fm_n$ are introduced into the corresponding signal channels through the primary winding 41 of each transformer. Accordingly, the output network 47 in the collector circuit will be more complicated since it will need to respond to a band of frequencies about each of $fm_1$, $fm_2$, $fm_3$, . . . $fm_n$. For this embodiment the output energy will consist of a time sequence of energy bands centered about $fm_1$, $fm_2$, $fm_3$, . . . $fm_n$ in agreement with the time sequence of activation of the corresponding individual target plates by the rotating beam.

While a circular path for the electron beam has been used in the detailed description above, the action disclosed is not dependent upon such symmetry and target plate display. Time sequence of target plate activation of other forms is permissible. Although a specific form of electron gun structure has been discussed, it is apparent that any gun structure producing a focussed beam of electrons is suitable.

As many other changes could be made in the above construction and many widely different embodiments of this invention could be made without departing from the scope thereof, it is intended that the matter contained in the above description and accompanying drawings shall be interpreted as illustrative and not in a limiting sense.

What is claimed is:

1. In combination, an energy ray tube including secondary emissive target means and collector means providing a plurality of independent nonlinear secondary emission electron current paths therebetween, ray control means for causing said ray to activate said current paths in succession, a plurality of signal input channels, means to impress the signals from the several input channels individually on corresponding ones of said electron current paths, means including a source of modulating waves for establishing currents of a modulating frequency in each of said paths, and a common collector circuit coupled to said paths.

2. In combination, a cathode ray tube including collector and secondary emissive target means for providing a plurality of independent nonlinear secondary emission electron current paths therebetween, cathode ray control means for causing said ray to activate said current paths in succession, a plurality of separate signal input channels, means for impressing signal waves from the several input channels on corresponding ones of said current paths, means for applying high frequency waves of carrier frequency to each of said paths, and a common collector circuit coupled to said paths for collecting from said secondary electron currents time-separated samples of said signal waves modulated by the nonlinearity of said emission paths in accordance with said carrier waves.

3. In combination, a cathode ray tube including a plurality of separate secondary emissive target elements, ray direction control means for directing said cathode ray to different target elements in succession, a collector element adjacent said target elements for receiving secondary electrons emitted therefrom, means for individually applying each of a plurality of signal waves from separate signal input channels to a corresponding target element, a source of high frequency carrier waves connected in common to each of said target elements, and a common output circuit between said collector and target elements for delivering time-separated samples of said signal waves which differ in frequency from said signal waves by the frequency of said carrier source.

4. In combination, a cathode ray tube including means for producing a plurality of independent non-linear secondary emission electron current paths, said means comprising a plurality of spaced secondary emissive target electrodes, cathode ray deflecting means for causing said cathode ray to impinge upon said target electrodes in repeated succession, a common collector electrode adjacent said target electrodes for receiving secondary electrons emitted therefrom, a plurality of separate signal input channels individually connected to a different one of said target electrodes for controlling the secondary emission therefrom, modulating means connected in circuit relationship with said target electrodes for applying high frequency waves of carrier frequency to each of said target electrodes, and a common output channel connected between said target and collector electrodes for collecting from said secondary electron currents time-separated samples of said signal waves modulated with said carrier waves by the non-linearity of said emission paths.

5. A system in accordance with claim 4 wherein said modulating means comprises a single source of carrier waves connected in common to each of said target electrodes to obtain time-separated samples of said signal waves modulated at the same carrier frequency.

6. A system in accordance with claim 4 wherein said modulating means comprises a plurality of carrier frequency sources each of a different frequency, each source being individually impressed on corresponding ones of said target electrodes to obtain a time-separation of output signal samples modulated at different carrier frequencies.

7. In a carrier modulated multiplex transmission system, a cathode ray distributor tube including means for producing a plurality of independent non-linear secondary emission electron current paths, said means comprising a plurality of electrically separate secondary emissive target electrodes disposed in circular array, means for circularly deflecting said cathode ray to impinge upon said target electrodes in repeated succession, an annular collector electrode surrounding said target electrodes and in electron receiving relation therewith, means for applying each of a plurality of signal input voltages from separate input channels to a different one of said emissive target electrodes to control the secondary emission therefrom, modulating means comprising at least one source of carrier waves of high frequency connected in circuit relationship with said target electrodes for modulating said current paths in accordance with the frequency of said carrier waves, and a common output circuit connected between said target and collector electrodes for delivering multiplexed carrier modulated signal samples modulated by the nonlinearity of said secondary emission current paths.

8. The method of multiplexing and modulating a plurality of signal waves from a series of separate input channels for transmission at high frequencies which comprises the steps of producing a plurality of independent non-linear secondary emission electron current paths in repeated succession, individually impressing said signal waves upon respectively corresponding current paths, impressing high frequency waves of carrier frequency upon each of said current paths, and collecting in common from said secondary electron currents multiplexed samples of said signal waves modulated at the frequency of said carrier waves by the non-linearity of said current paths.

9. The method in accordance with claim 8 above in which high frequency waves of the same carrier frequency are impressed upon each of said current paths to obtain multiplexed samples of said signal waves modulated at the same carrier frequency.

10. The method in accordance with claim 8 above in which a plurality of carrier waves each of a different frequency are individually impressed on corresponding ones of said current paths to obtain multiplexed samples of said signal waves modulated at different carrier frequencies.

11. In combination, an energy ray tube including a plurality of secondary emissive target means, ray control means for causing said ray to activate said target means in repeated succession, collector means adjacent said target means for receiving secondary electrons emitted therefrom, means for biasing said collector means positive with respect to said target means to enable operation of said tube over a non-linear portion of the secondary current versus voltage characteristic of the emission current paths between said target and collector means, a plurality of signal input channels, means for impressing signal waves from said signal channels individually upon corresponding ones of said emission current paths, means including a source of modulating waves of carrier frequency for impressing said modulating waves upon said emission current paths, and a common collector circuit connected between said target and collector means for collecting from said emission current paths time-separated samples of said signal waves modulated with said carrier waves by the non-linearity of said emission current paths.

12. A cathode-ray tube for sampling signal waves from a plurality of signal input channels and for modulating the sampled signal waves with high frequency carrier waves, said tube comprising, in combination, a plurality of separate secondary emissive target elements, ray direction control means for directing said cathode-ray to different ones of said target elements in succession, a collector element adjacent said target elements for receiving secondary electrons emitted therefrom, means for biasing said collector element positive with respect to said target elements to enable operation of said tube over a non-linear portion of the secondary current versus voltage characteristic of the emission current paths between said target and collector elements, means for impressing signal waves from said signal channels individually upon corresponding ones of said target elements, means including a source of modulating waves of carrier frequency connected in circuit relationship with said target elements for establishing currents of modulating frequency in each of said current paths, and a common collector circuit connected between said target and collector elements.

WILLIAM E. KIRKPATRICK.

REFERENCES CITED

The following references are of record in the file of this patent:

UNITED STATES PATENTS

| Number | Name | Date |
|---|---|---|
| 2,250,528 | Gray | July 29, 1941 |
| 2,257,795 | Gray | Oct. 7, 1941 |